United States Patent
Flörsheimer et al.

(10) Patent No.: US 7,147,245 B2
(45) Date of Patent: Dec. 12, 2006

(54) AIRBAG DEPLOYMENT MONITORING APPARATUS

(75) Inventors: Stefan Flörsheimer, Flörsheim (DE); Rolf Sawall, Schwalbach (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 175 days.

(21) Appl. No.: 10/611,947

(22) Filed: Jul. 3, 2003

(65) Prior Publication Data
US 2004/0178615 A1   Sep. 16, 2004

(30) Foreign Application Priority Data
Mar. 13, 2003   (DE) ................. 103 11 062

(51) Int. Cl.
*B60R 21/16*   (2006.01)
(52) U.S. Cl. .................... 280/735; 280/743.2
(58) Field of Classification Search ............... 280/735, 280/739, 743.1, 743.2
See application file for complete search history.

(56) References Cited

U.S. PATENT DOCUMENTS

| | | | |
|---|---|---|---|
| 5,762,367 A * | 6/1998 | Wolanin ................. | 280/736 |
| 5,957,490 A | 9/1999 | Sinnhuber | |
| 6,129,379 A | 10/2000 | Specht | |
| 6,189,928 B1 | 2/2001 | Sommer et al. | |
| 6,241,282 B1 | 6/2001 | Specht | |
| 6,254,130 B1 * | 7/2001 | Jayaraman et al. ...... | 280/743.2 |
| 6,308,983 B1 | 10/2001 | Sinnhuber | |
| 6,425,603 B1 * | 7/2002 | Eschbach ................. | 280/743.2 |
| 6,572,140 B1 | 6/2003 | Specht | |
| 6,616,184 B1 * | 9/2003 | Fischer ................... | 280/743.2 |
| 6,685,221 B1 * | 2/2004 | Serban et al. ............ | 280/735 |
| 6,789,818 B1 * | 9/2004 | Gioutsos et al. ......... | 280/735 |
| 6,825,654 B1 * | 11/2004 | Pettypiece et al. ...... | 324/166 |

FOREIGN PATENT DOCUMENTS

| | | |
|---|---|---|
| DE | 298 05 217 U1 | 7/1998 |
| DE | 198 16 075 A1 | 10/1999 |
| DE | 198 37 749 A1 | 3/2000 |
| EP | 0 836 971 A1 | 4/1998 |
| EP | 0 990 567 A1 | 4/2000 |
| EP | 0812741 | 12/2001 |

OTHER PUBLICATIONS

U.S. Appl. No. 10/321,524, filed Dec. 2002, Husby et al.
U.S. Appl. No. 10/359,257, filed Feb. 2003, Husby.
U.S. Appl. No. 10/369,697, filed Feb. 2003, Pettypiece, Jr.
U.S. Appl. No. 10/391,577, filed Mar. 2003, Husby.
U.S. Appl. No. 10/419,949, filed Apr. 2003, Stembler.
U.S. Appl. No. 10/434,176, filed May 2003, Ford.

* cited by examiner

*Primary Examiner*—Paul N. Dickson
*Assistant Examiner*—Laura B Rosenberg
(74) *Attorney, Agent, or Firm*—Lonnie Drayer

(57) ABSTRACT

An airbag module, in particular for a frontal airbag, has an inflator, an airbag and at least one substantially tape or cord shaped measuring element. A first end of the measuring element is connected to an inside surface of the airbag and the second end of which is substantially arranged in a storage device for the measuring element. Between the first and the second ends of the measuring element is located a measuring device for the measurement of the advance movement distance, the advance movement velocity and/or the advance movement time of the measuring element. A tensioning device for the measuring element is arranged between the measuring device and the second end of the measuring element, or at the second end, to tighten the measuring element between its first end and the measuring device prior to the deployment of the airbag.

9 Claims, 5 Drawing Sheets

AIRBAG DEPLOYMENT MONITORING APPARATUS

FIELD OF INVENTION

The invention relates to an airbag module, in particular for a frontal airbag.

BACKGROUND OF THE INVENTION

Airbag modules comprising control or regulation devices for controlling or regulating the inflation volume or the gas flow in an airbag are known from the prior art. For instance, EP 0 812 741 B1 describes an airbag device having a tape or cord shaped detection medium that is secured to the inner surface of the airbag and which concurrently carries out the advance movement of the airbag, thus detecting the latter. Should the occupant be situated too close to the airbag module or be "out of position", the velocity of the deployment of the airbag is decreased, whereby this delay of the airbag unfolding is detected by the measuring strips or the thereto connected measuring device. By means of the signals emitted by the measuring device, various devices affecting the airbag deployment velocity, for instance the non-ignition of a second inflator level or a redirection of the flow of inflation gas, can be controlled, whereby the airbag does not reach maximum volume and the vehicle occupant is thus not hurled away from the airbag module or injured by the aggressive opening of the airbag.

The problem in this case is to design the manufacturing process such that, during their initial state, i.e. prior to the release, the measuring strips are arranged in the measuring strip container or airbag module in a tight manner, in order to obtain a precise measuring value output without delay.

SUMMARY OF THE INVENTION

The present invention provides an airbag module, in particular for a frontal airbag, whereby the measuring of the airbag's advance movement can be carried out in a precise manner, to provide an operationally reliable airbag.

There is provided in accordance with the present invention airbag module comprising an inflator, an airbag and at least one substantially tape or cord shaped measuring element, a first end of the at least one substantially tape or cord shaped measuring element is connected to an interior surface of the airbag and a second end of at least one substantially tape or cord shaped measuring element is arranged in a storage device for the measuring element, whereby between the first and the second ends of the at least one substantially tape or cord shaped measuring element is located a measuring device for the measurement of the advance movement distance, the advance movement velocity and/or the advance movement time of the measuring element, and whereby a tensioning device for the measuring element is arranged between the measuring device and the second end, or at the second end, to tighten the measuring element between the first end and the measuring device prior to a deployment of the airbag.

DETAILED DESCRIPTION OF THE INVENTION

Figure 1:
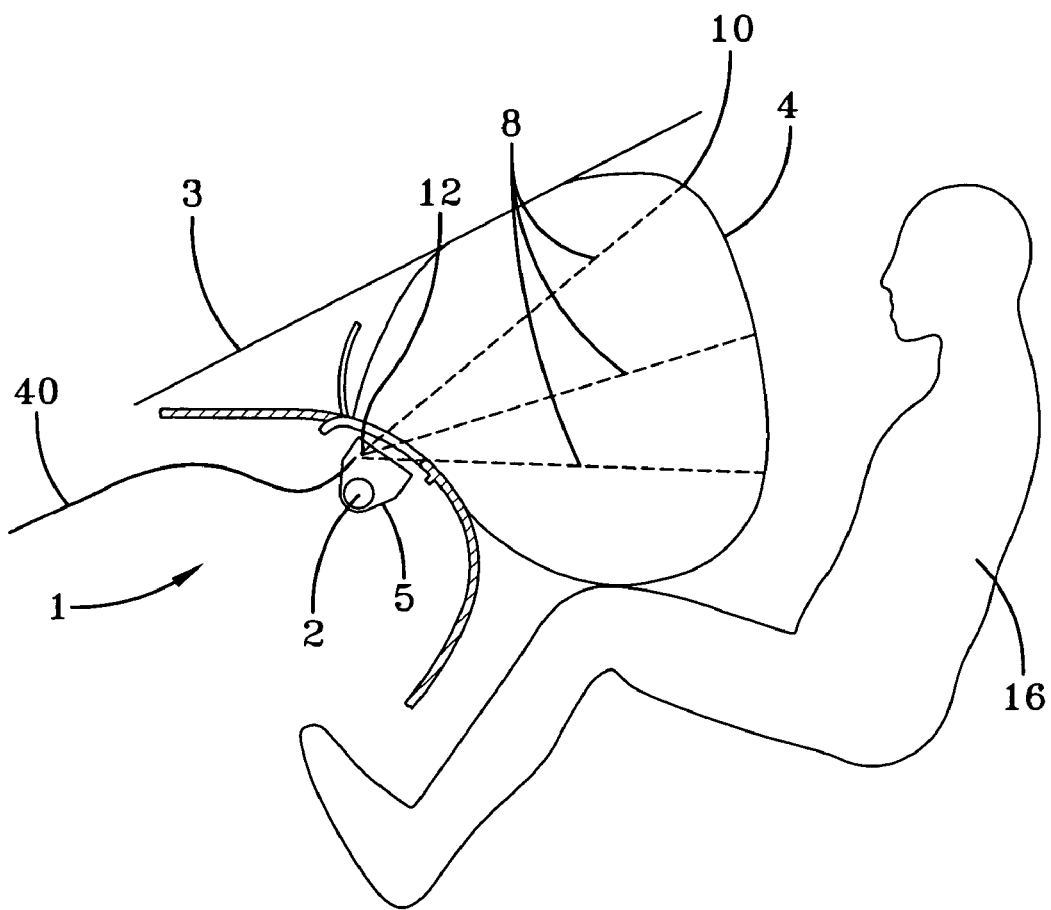
FIG. 1 shows a partly sectioned side view of the airbag module according to a first embodiment.

The arrangement of an airbag module 1 shown in FIG. 1 comprises an inflator 2, an airbag 4 and an airbag module housing 5. Within the airbag 4, at least one measuring element 8 extends with a first end 10 of the measuring element connected to the inner side of the airbag 4. The second end 12 of the measuring element 8 is accommodated substantially in the airbag module housing 5, in particular in a storage device as for instance a sleeve or sheath 40. When deployed the airbag expands towards a vehicle occupant 16 and occupies the space between the vehicle occupant and the vehicle's front window 3 and the instrument panel and/or steering wheel. The first end 10 of the measuring element 8 is preferably attached to the inner surface of the airbag 4, which lies opposite the outer surface of the airbag 4, with which a vehicle occupant 16 comes into contact or gets thrown into in a crash.

The at least one measuring element 8 is substantially tape or cord shaped in cross section. As used herein and in the claims "substantially tape or cord shaped" is understood to mean that the measuring element has a cross section that is either substantially rectangular or circular, but also includes inconsequential variations such as oval, slightly arcuate rather than perfectly rectangular, rectangular but having rounded corners and so forth. For example, the substantially tape or cord shaped measuring element can be a flat web comprising a non-tear, woven fabric material.

In this embodiment the sleeve or sheath 40 is substantially similar to a Bowden cable. The sleeve or sheath or the strip channel can advantageously be manufactured from plastic material sold by the meter. In this case the measuring element 8 is for instance threaded into the sleeve or sheath by an assembly wire, or sucked or inserted into the sleeve or sheath, for instance by means of negative pressure. In this embodiment, in contrast to storage on a reel, no moments of mass inertia need to be overcome during the pulling out and there is no need for an additional decelerator. In an advantageous manner, once the airbag folding process or the assembly of the airbag module is completed, the measuring element can be pulled out to the free end of the sleeve or sheath and beyond the latter, to tension the measuring element in a corresponding manner. The projecting section of the measuring element 8 can be cut off at the level of the sleeve or sheath, so that no loose parts remain in the airbag module. In an advantageous manner, the sleeve or sheath can extend behind the dashboard of a vehicle or in its ventilation ducts or other suitable hollow spaces.

Figure 6:
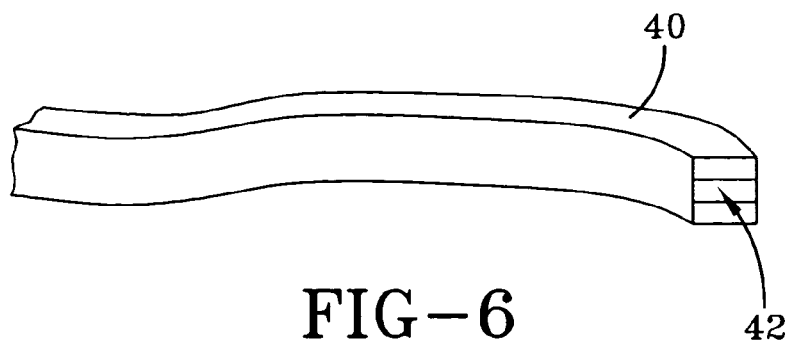
FIG. 6 shows a perspective view of a storage device according to a first embodiment of the present invention.

As shown in FIG. 6 the sleeve or sheath 40 furthermore preferably comprises at least one sleeve or sheath chamber 42, or a hollow chamber open at both sides, which extends over its entire longitudinal direction. It is thus advantageously possible to accommodate a multitude of measuring elements 8 in a sleeve or sheath. In an advantageous manner, a tangling of the several measuring elements is avoided, in that in each case only one measuring element is accommodated in each sleeve or sheath chamber.

The measuring element is preferably accommodated in one layer in the sleeve or sheath chamber 42. Due to the avoidance of a fold or a corrugated arrangement of the measuring element in the sleeve or sheath or the chamber, a tangling up or confusion or knotting is preferably avoided. The airbag advance movement can thus be safely measured in an advantageous manner by means of the measuring strips.

The sleeve or sheath 40 is preferably designed in several parts, preferably along its longitudinal direction. In this case the sleeve or sheath can for instance be designed in two parts, whereby during the assembly the measuring element or measuring elements are inserted in one part of the strip channel, which is then closed with the second part of the sleeve or sheath, for instance by being clipped shut, glued or welded.

The sleeve or sheath 40 is advantageously designed to be flexible and/or spiral shaped. In this manner it is advantageously achieved that the sleeve or sheath need not be forcefully accommodated in an extended manner in the vehicle, but that it can be rolled and correspondingly arranged on the module housing. The sleeve or sheath 40 can preferably also display the shape of a spiral, which can be cast in an advantageous manner in one piece on the airbag module housing.

The sleeve or sheath 40 is preferably connected directly to the airbag module housing, and preferably cast in one piece on the airbag module housing. In this manner the manufacturing or assembly of the airbag module can be advantageously simplified, since fewer pieces need to be assembled.

Figure 2:
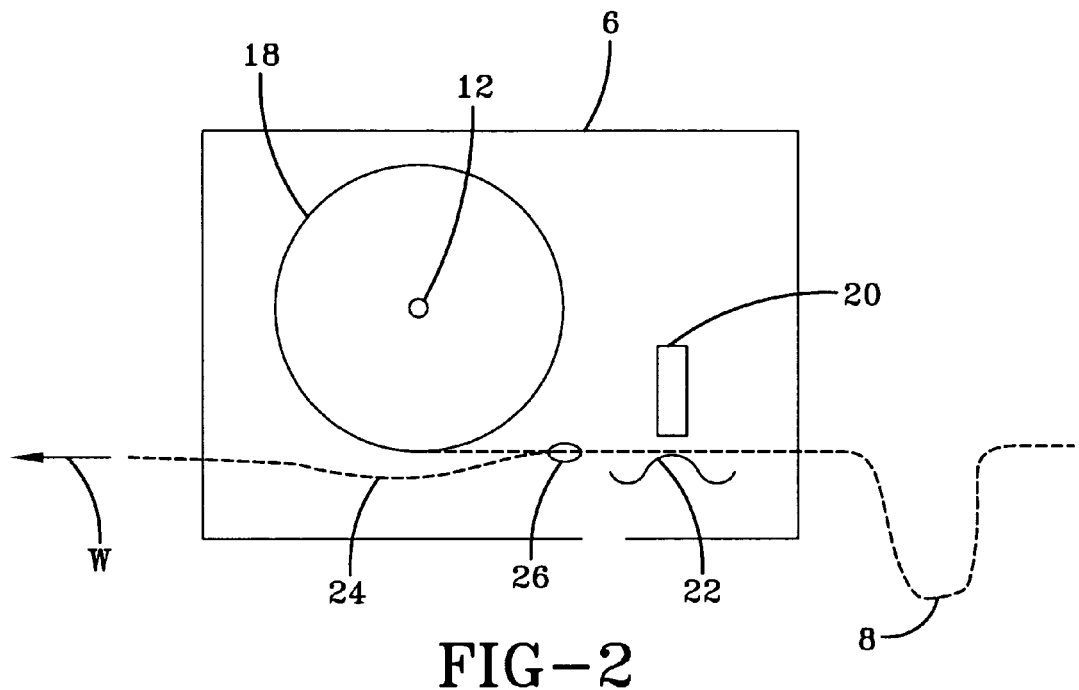
FIG. 2 shows a view of the airbag module or the container of the airbag module according to a second embodiment of the invention in a non-tightened state.

FIG. 2 is an enlarged sectional view of a second embodiment of the present invention. In this embodiment the second end 12 of the measuring element 8 is accommodated substantially in a storage device that is a measuring element retractor 18. Furthermore a measuring device 20 is arranged to interact with the measuring element 8, opposite which a deceleration device 22 is positioned, whereby the measuring element 8 extends interposed between the deceleration device 22 and the measuring device 20. Between the measuring device 20 or the deceleration device 22 and the measuring element retractor 18 or the second end 12 of the measuring element 8, a second element 24 is connected to the measuring element 8 by a detachable connection 26 to serve as a tensioning device. The second element 24, which is also substantially tape or cord shaped, is led out of the airbag module housing 5 or container 6 by its end positioned opposite the detachable connection 26 a tear seam or as a self-adhesive strip piece, to thus projects out of the airbag housing to tension or tighten the second element 24 or the measuring element 8 in the tightening direction of the arrow W. Due to the second, substantially tape or cord shaped element or tensioning or auxiliary strip, the measuring element in the airbag module can be advantageously tightened in a simple manner, in that the second substantially tape or cord shaped element is pulled out of the airbag housing, so that the measuring element is tightened in the airbag module or pulled into the latter. Should the tensioning device be activated and the second tape or cord shaped element be pulled out of the airbag module or the container, the second element can detach itself from the measuring element and be removed from the airbag module. In this manner, loose parts around the airbag module are advantageously avoided. In this manner, a simple handling of the tensioning device can be advantageously ensured.

The substantially tape or cord shaped measuring element can be provided with a black and white bar code. Due to the deceleration device it can be advantageously avoided that, after its tightening, the measuring element moves back into its non-tightened state. Furthermore, the measuring element is held tight during the release process in the region of the measuring device, whereby errors of the markings read from the measuring element can be advantageously avoided. The measuring element tightening must be carried out prior to the release of the airbag, but can preferably already be carried out during the manufacturing of the airbag module as such or else during its installation.

Figure 3:
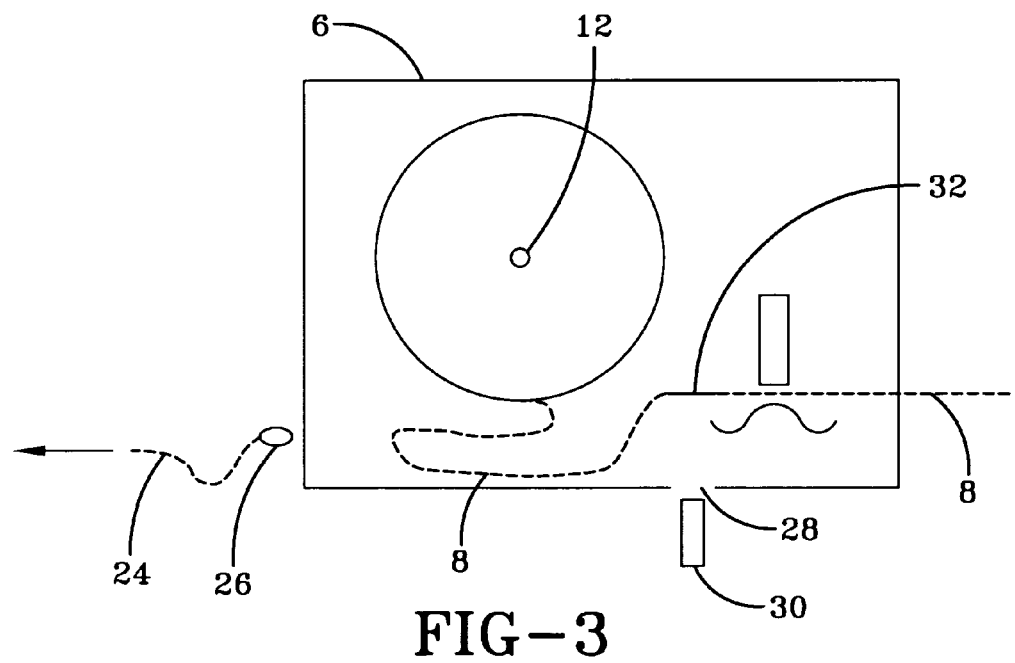
FIG. 3 shows a view of the second embodiment of the invention in a tightened state.

FIG. 3 shows the state of the container 6 after the tightening of the measuring element 8. In this case, after the tightening, the second element 24 has detached itself from the measuring element by means of the detachable connection 26, i.e. it can be removed from the airbag module. The originally non-tightened part of the measuring element 8 is now completely tightened, whereby a correspondingly non-tightened region of the measuring element 8 is now created upstream of the measuring device 20. In the airbag container or container 6 a test opening 28 is further foreseen, via which the tightened state of the measuring element 8 can be controlled by a control device 30. Via this type of test opening or control opening, which is positioned just upstream of the measuring device between the measuring device and the storage device, the zero position can be checked after the assembly in an advantageous manner by means of an external test device. An operationally reliable airbag is thus advantageously ensured. To this effect a code or test marking 32, which can be detected by the measuring device in a preferably capacitive, inductive, optical or mechanical manner. A precise detection and measuring is thus achieved. A tightened state of the measuring element 8 is detected when the code is positioned substantially aligned with the test opening 28 in the tightened state of the measuring element 8. In this manner, the control device 30 is informed by the code 32 that the measuring element 8 is tightened. This type of code can for instance be foreseen in that, at the corresponding point of the measuring element at the test opening, a black/white code displays a larger distance, whereby it is advantageously simple and easy to recognize that the measuring element is located in the assembled airbag module without loops. The code can, however, also be designed in a different color or shape. Furthermore, due to the various codes on the measuring element, a multitude of various measuring elements can be used and a high variability of measuring elements ensured.

Figure 4A:
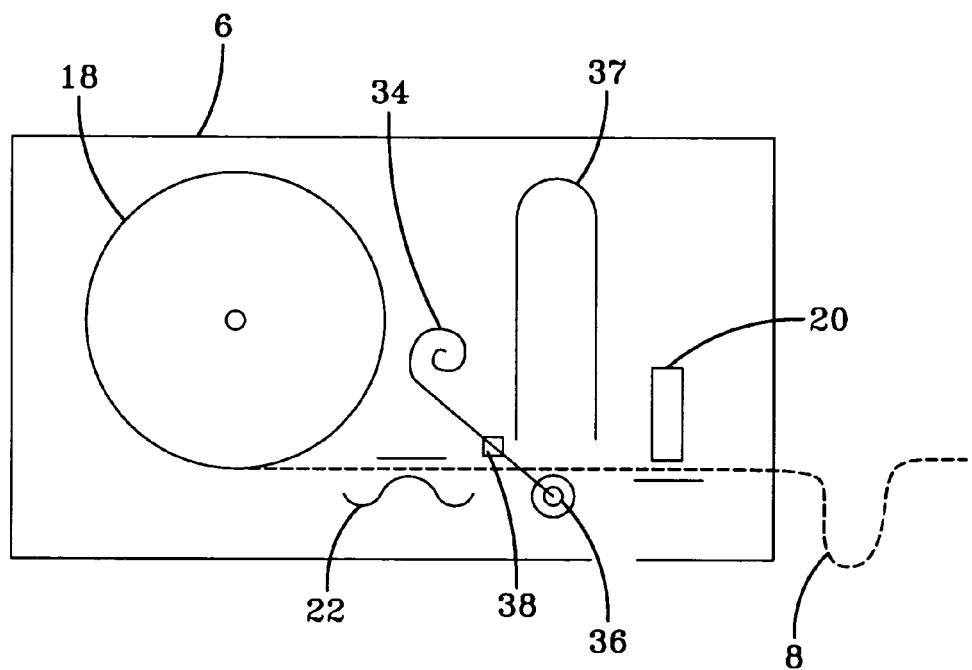
FIG. 4a shows a view of the airbag module or the container of the airbag module according to a third embodiment of the present invention in a non-tightened state.

FIG. 4a shows substantially a second embodiment of the tensioning device, whereby in this case between the measuring device 20 and the measuring element retractor 18 a spring-like tensioning device 34 is arranged, the first end of which is securely connected to the container 6 and the second end is a free, restorable end of which is foreseen with a reel 36, which in its operative state pushes against the measuring element 8 to tighten the latter. The free, reversible end of the spring-like tensioning device 34 can be brought into engagement with a part of the region of the measuring element which lies between the measuring device and the second end. In this case the reel 36 or the part of the measuring element 8 situated above the reel 36 is guided in a conduit 37. In an advantageous manner, the spring-like tensioning device 34 comprises a locking device 38. This locking device 38 enables a pre-tensioning of the spring-like tensioning device, without engaging the measuring element. After the assembly, the locking device of the spring-like tensioning device can be released, in order to tighten the measuring element between its first end and the measuring device.

The spring-like tensioning device 34 can be a spiral spring that acts in an substantially perpendicular manner in relation to the measuring element or as another type of spring. The end of the spring that can be brought into engagement with the measuring element is preferably foreseen with a reel or an element which will not damage the measuring element. Due to the arrangement of the spring-like tensioning device between the measuring device and the second end of the measuring element, the region of the measuring element between its first end and the measuring device can be tensioned. In this case a decelerator can be arranged to interact with the measuring element in an advantageous manner between the tensioning device and the storage device, to optimize the tensioning process, since a pulling out of the measuring element from the storage device is not carried out.

To ensure that the region of the measuring element 8 that is not tightened extends between the measuring device 20 and the first end 10 of the measuring element 8, a deceleration device 22 is arranged to interact with the measuring element 8 between the tensioning device 34 and the measuring element retractor 18. In this way, with an activated tensioning device 34, the measuring element is not unwound from the measuring element retractor 18; instead the loose region of the measuring element 8 between the measuring device 20 and the first end 10 is taken up. The tensioning device 34 furthermore comprises a locking device 38, by means of which the tensioning device 34 can be locked in its tightened state prior to the installation of the airbag or during its production.

Figure 4B:
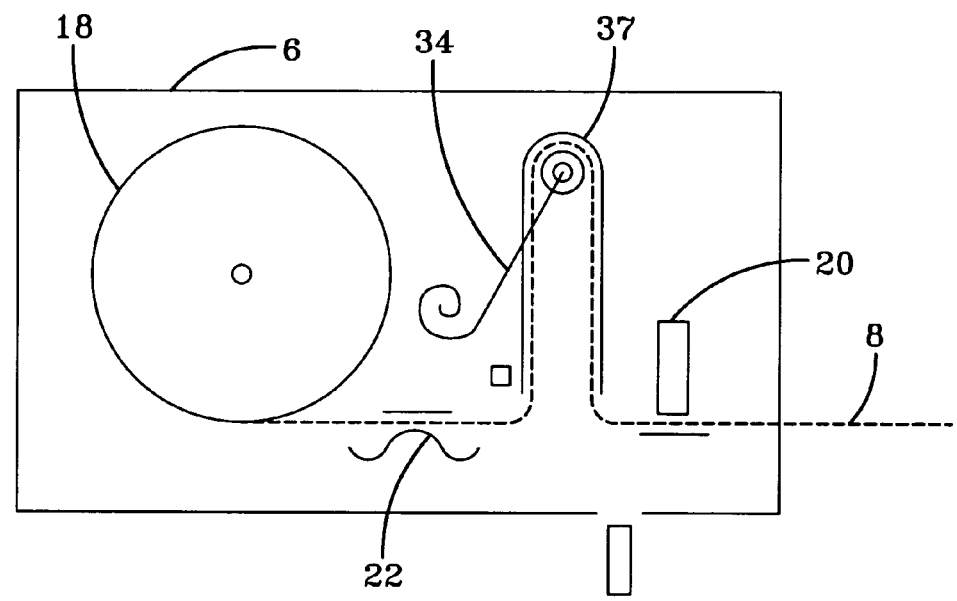
FIG. 4b shows a view of the third embodiment in a tightened state.
Figure 5:
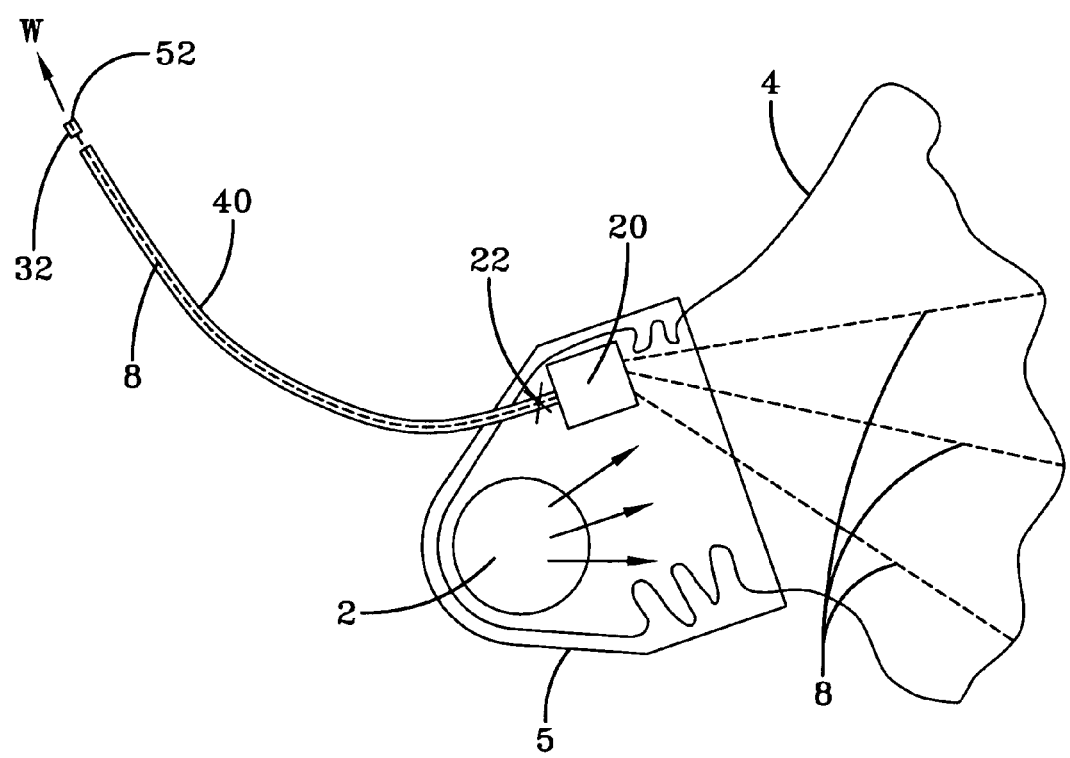
FIG. 5 shows a sectional view of the first embodiment of the present invention.

The tightened state of the measuring element 8 can preferably be controlled by means of the measuring device 20. To tighten the measuring element 8, as shown in FIG. 4*b*, the locking device 38 is detached after the airbag 4 is folded and accommodated in the airbag module housing 5 or container 6, whereby the tensioning device 34 tightens the measuring element 8. In this manner, the measuring element 8 is upwardly tightened, i.e. brought into a zero or initial position, by the tensioning device 34 in the conduit 37. During deployment of the airbag, the tensioning device 34 is moved downwards or opposite to its restoring direction, whereby an additional deceleration effect is achieved on the measuring element 8. In this manner the provision of a control opening in the container can be advantageously avoided, whereby an improved encapsulation of the airbag module with regard to the surroundings is enabled, resulting in an increased operational reliability of the airbag module.

FIGS. 5–7*d* are enlarged sectional views of the airbag module according to the first embodiment shown in FIG. 1. In this case the storage device for the measuring element 8 is a sleeve or sheath 40, the first end of which extends into the airbag module housing 5 or is attached to the latter, and the second end of which extends from the airbag module housing 5. The measuring element 8 is arranged in the sleeve or sheath 40 in a single layer. A second end 52 of the measuring element 8 extending beyond the sleeve or sheath 40 is advantageously tensioned in the arrow direction W and cut off to end on an even level with the latter. The second end 52 of the measuring element 8 extending beyond the sleeve or sheath 40 can also advantageously be foreseen with a code 32, preferably a colored marking, to indicate that the measuring element 8 is in a tightened state. In this manner, the desired length of the measuring element can be controlled, i.e. it is indicated whether the measuring element is already in a tightened state.

The sleeve or sheath 40 can advantageously consist of several sleeve or sheath chambers or of hollow chambers open on both sides 42 extending substantially along its longitudinal direction and through which in each case a measuring element 8 extends. The sleeve or sheath 40 does not need to be forcibly accommodated in an extended state in the vehicle, but due to its flexibility it can be rolled up after the installation of the module and secured to the container 6 or the airbag module housing 5.

Figure 7A:
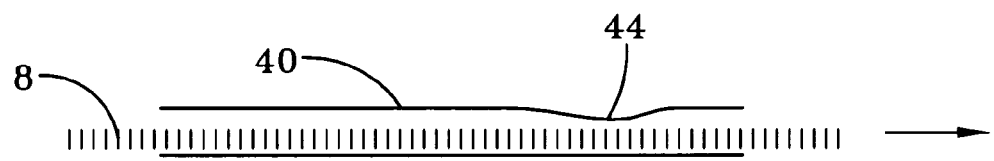
FIGS. 7a–7d show sectional views of various embodiments of the storage device according to FIG. 6.

FIGS. 7*a*–7*d* show various embodiments of the sleeve or sheath 40. In FIG. 7*a* the deceleration function is already incorporated into the sleeve or sheath 40 by an indented region 44, which brings about increased friction between the sleeve or sheath 40 and the measuring element 8 and thus creates a deceleration effect. By creating an indented region of the sleeve or sheath by means of defined indentation of the sleeve or sheath under the influence of heat, a simple and cost-effective deceleration device can be advantageously achieved.

Figure 7B:
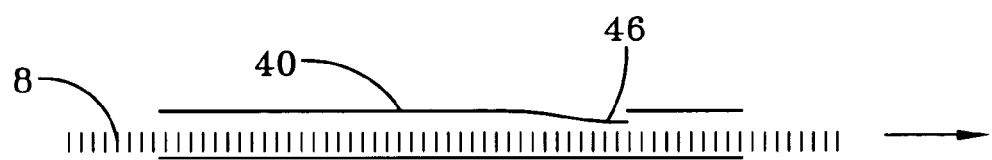

In FIG. 7*b* there is shown as an alternative to the indented region 44, a spring loaded bracket 46 arranged in the sleeve or sheath 40 could also be integrated, likewise creating a deceleration effect for the measuring element 8. By designing a spring-loaded bracket on one section of the sleeve or sheath or by arranging additional components with a tensioning element, a precise decelerating effect can be advantageously achieved.

Figure 7C:
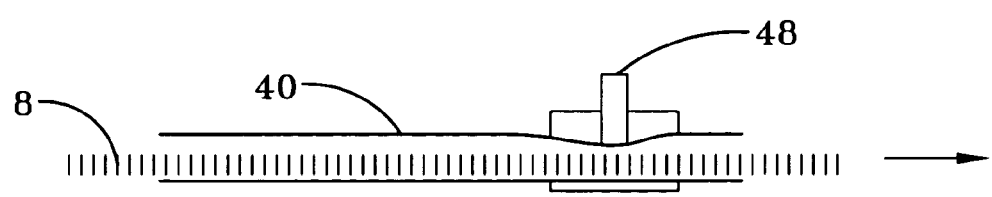

FIG. 7*c* shows a further possibility of a deceleration device integrated in the sleeve or sheath 40 by means of an additional deceleration element or tensioning element 48. By means of the provision of this type of tensioning element 48 the deceleration effect can advantageously be precisely set or adjusted.

Figure 7D:
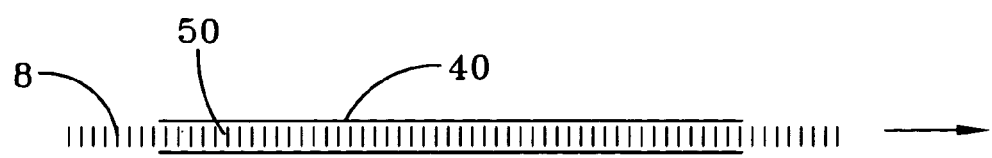

Additionally or alternatively, it is also possible to have as shown in FIG. 7*d* a region or the entire inner surface of the sleeve or sheath 40 with a rough surface 50 or a predetermined surface roughness, which creates a corresponding deceleration effect on the measuring element 8. By providing a rough inner surface in at least one region of the sleeve or sheath, the deceleration device can be advantageously manufactured in a simple and therefore cost-effective manner.

A procedure for the manufacturing or production of an airbag module according to the present invention, in particular for a frontal airbag, may comprise the following steps: preparation of an airbag module 1 according to the invention; introduction or installation of the measuring element 8 in or on the airbag 4; folding of the airbag 4; introduction or installation of the measuring element 8 in the airbag module 1 or container; tensioning of the measuring element by means of the tensioning device 34; and control of the tightened state of the measuring element. The step of tightening the at least one measuring element 8 by the tensioning device is preferably carried out (a) by tensioning a second tape or cord shaped element 24 at its part projecting from the airbag housing, whereby the second element detaches itself from the measuring element after the tightening procedure; or (b) by activating a spring-like tensioning device 34; or (c) by tensioning the second end of the measuring element projecting from the sleeve or sheath. In this manner an advantageous operationally reliable airbag module is created, since a delay in measurement reaction time is advantageously avoided due to the measuring element.

Although this invention has been described by way of example and with reference to possible embodiments thereof, it is to be understood that modifications and improvements may be made without departing from the spirit or scope of the invention.

We claim:

1. An airbag module comprising an inflator, an airbag and at least one substantially tape or cord shaped measuring element, a first end of the at least one substantially tape or cord shaped measuring element is connected to an interior surface of the airbag and a second end of at least one substantially tape or cord shaped measuring element is arranged in a storage device for the measuring element, whereby between the first and the second ends of the at least one substantially tape or cord shaped measuring element is located a measuring device for the measurement of one or more of the advance movement distance, the advance movement velocity or the advance movement time of the measuring element, and whereby a tensioning device for the measuring element is arranged between the measuring device and the second end, or at the second end, to tighten the measuring element between the first end and the measuring device prior to a deployment of the airbag, wherein the storage device for the measuring element is a sleeve or sheath formed of at least one flexible or spiral shaped cable connected at one end directly to an airbag housing module, each cable comprising at least one longitudinally extending sleeve or sheath chamber extending along the length of the cable for storing one of the at least one substantially tape or cord shaped measuring elements per chamber.

2. The airbag module according to claim 1, wherein the measuring element is arranged in the sleeve or sheath in a single layer.

3. The airbag module according to claim 1, wherein the sleeve or sheath comprises several parts along a longitudinal direction thereof.

4. The airbag module according to claim 1, wherein the airbag module comprises a deceleration device for decelerating the movement of the measuring element.

5. The airbag module according to claim 4, wherein the deceleration device is arranged on the storage device.

6. The airbag module according to claim 5, wherein the deceleration device is an indented region of the sleeve or sheath.

7. The airbag module according to claim 5, wherein the deceleration device is a spring loaded bracket.

8. The airbag module according to claim 5, wherein the deceleration device is a roughened inner surface of the sleeve or sheath.

9. The airbag module according to claim 1, wherein the second end of the measuring element comprises a code.

* * * * *